W. H. I. HOWE.
SOLDERING-MACHINE.
No. 178,642.                    Patented June 13, 1876.
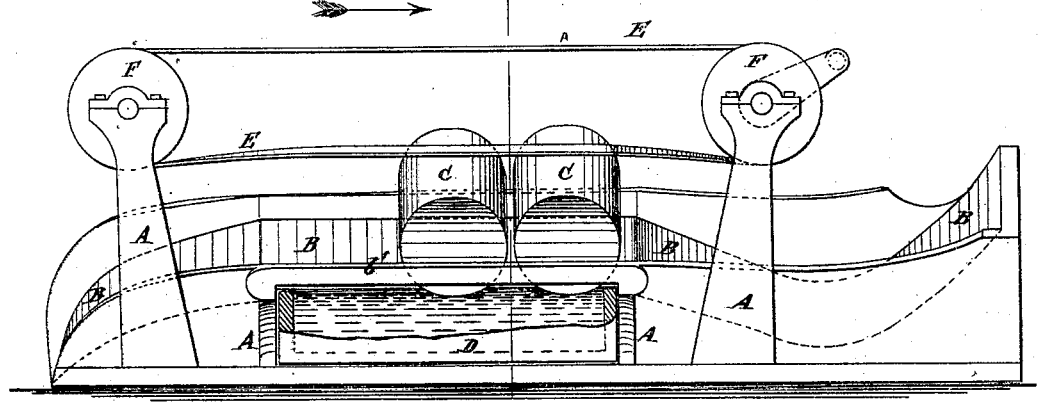
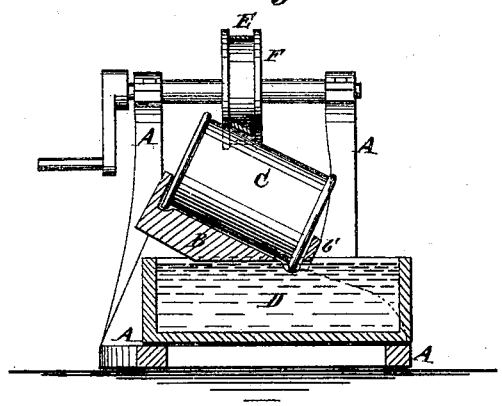
WITNESSES:                       INVENTOR:

UNITED STATES PATENT OFFICE.

W. H. IRELAND HOWE, OF NORTH SALEM, NEW YORK.

IMPROVEMENT IN SOLDERING-MACHINES.

Specification forming part of Letters Patent No. 178,642, dated June 13, 1876; application filed April 4, 1876.

*To all whom it may concern:*

Be it known that I, W. H. IRELAND HOWE, of North Salem, county of Westchester and State of New York, have invented a new and Improved Soldering-Machine, of which the following is a specification:

Figure 1 is a front view of my improved machine. Fig. 2 is a cross-section of the same, taken through the line $x\ x$, Fig. 1.

The object of this invention is to furnish an improved machine for soldering the ends upon cans rapidly and thoroughly, and which shall be simple in construction and convenient in use.

The invention consists in the track made with a side inclination and a slot along the lower side of its middle part, and provided with an endless belt, in combination with a solder-bath for soldering the end seams of cans, as hereinafter fully described.

Similar letters of reference indicate corresponding parts.

A represents the frame of the machine, to which is attached a platform, track, or way, B, along which the cans C are to be rolled. The track B is flanged along its side edges to keep the cans C in place upon it, and has a side inclination, to cause the ends of said cans to rest upon the lower side flange $b'$ as they are rolled along said track. The track B is slotted in the lower side of its middle part, along the flange $b'$, to allow the end seam of the cans C to project through into a solder-bath, D, placed beneath it in the frame A, and in which the solder is kept melted by a furnace or other convenient means. The bath D should be of such a length that the cans may make at least one entire revolution with their end seams in the solder, so that all parts of the said seams may be brought in contact with the solder. The track B is made with an upward incline at one end, down which the cans are rolled in passing from the machine. The cans C are rolled along the track B by an endless band, E, which passes around pulleys F pivoted to the frame A, and to one of which motion may be given by hand-power or by other convenient power.

The band E may pass above the cans, as shown in the drawings, or below them, as may be most convenient, and should bear upon them with sufficient force to convey them along the track with a steady and uniform motion.

Having thus fully described my invention, I claim as new and desire to secure by Letters Patent—

The combination, in a soldering-machine, of the flanged, slotted, and inclined track B, endless band E, and solder-trough D, substantially as and for the purpose set forth.

W. H. IRELAND HOWE.

Witnesses:
JAMES T. GRAHAM,
T. B. MOSHER.